March 18, 1969 W. SMEULERS ET AL 3,434,004
DEFLECTION CIRCUIT WITH FREQUENCY DEPENDENT
NEGATIVE FEEDBACK
Filed Nov. 30, 1966

INVENTOR.
WOUTER SMEULERS
PETER J.H.JANSSEN
BY
Frank R. Trifari
AGENT 3,434,004

DEFLECTION CIRCUIT WITH FREQUENCY DEPENDENT NEGATIVE FEEDBACK

Wouter Smeulers and Peter Johannes Hubertus Janssen, Emmasingel, Eindhoven, Netherlands, assignors to North American Philips Company, Inc., New York, N.Y., a corporation of Delaware Filed Nov. 30, 1966, Ser. No. 598,029
Claims priority, application Netherlands, Dec. 10, 1965, 6516061
U.S. Cl. 315—27 6 Claims
Int. Cl. H01j 29/70

ABSTRACT OF THE DISCLOSURE

A field deflection circuit includes an A.C. negative feedback circuit to linearize the sawtooth output current, and direct current negative feedback circuit to minimize jumps in the conduction of a pair of series connected output transistors. In order to overcome the effect of the direct current feedback circuit in attenuating low frequency input signals, the input signal for the circuit is the sum of a sawtooth wave and a parabolic wave.

The invention relates to a circuit arrangement for producing a sawtooth current through a field deflection coil of a cathode-ray tube, comprising a generator providing a control-signal forming the sum of a substantially sawtooth-like signal and a substantially parabolic signal, and a final stage with which said deflection coil is coupled and to which said control-signal is applied.

Such a circuit arrangement is shown in U.S. Patent No. 2,471,819. In the circuit of this patent the control of the field output stage by means of a combined sawtooth-parabolic voltage was required, since in fact the field output transformer used was proportioned too critically.

In modern receivers, which are often equipped with transistors, considerably fewer difficulties, if any, arise in adapting the output impedance formed by the field deflection coil to the internal resistance of the field output stage. Therefore, choke coupling is possible, or, in the case of a so-called single-ended pushpull circuit, a direct coupling is possible. In such cases the transformer is omitted and the necessity of control by a combined sawtooth signal and a parabolic signal does not apply.

According to the idea of the invention it is nevertheless desirable, also in those cases in which coupling of the field deflection coil without transformer is allowed, to use said control mode, if the arrangement is such that the deflection coil is directly (i.e. without the interposition of a transformer) coupled with the output of the final stage and the low-frequency components are attenuated with respect to the components of higher frequency from the generator output to the final-stage output either by negative feedback especially of the direct current and the low-frequency components in said final stage or by coupling the generator with the input of the final stage by means of a high-bandpass filter.

Such a discrepancy is desired, since in a signal representing the sum of a sawtooth signal and a parabolic signal the low frequency components are stronger than the components of higher frequency as compared with a sawtooth signal alone. It is therefore possible to provide a frequency characteristic curve of the final stage which is inferior for these low frequency components, the control-signal containing an excess quantity thereof, so that the final linearity of the sawtooth current produced is not adversely affected.

A frequency characteristic curve intentionally made inferior in this way has the advantage that catching of the field deflection circuit is possible without vertical compression and expansion of the field (pudding effect).

A few possible embodiments of circuit arrangements according to the invention will be described with reference to the accompanying figures, of which:

Figure 1:
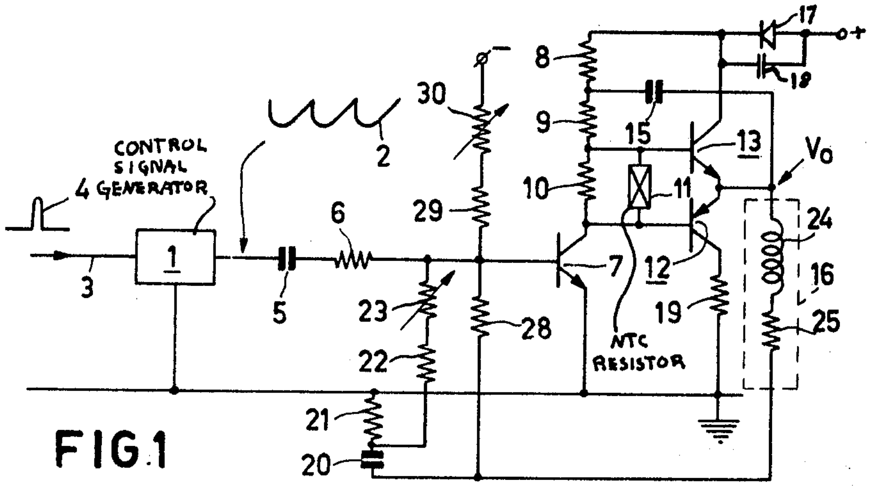
FIG. 1 shows a circuit according to the invention.

Referring to FIG. 1, the block 1 represents the generator supplying the desired control-signal 2 for the final stage. This control-signal 2 is formed in known manner by the sum of a sawtooth signal and a parabolic signal and may be obtained, for example, by producing a sawtooth signal, by integrating the same and by adding the parabolic signal resulting from the integration to the initial sawtooth signal. To the input 3 of the generator 1 are applied trigger pulses 4, which may be the vertical synchronizing pulses as derived from a television synchronizing signal.

The control-signal 2 is applied through a coupling capacitor 5 and a series resistor 6 to the base electrode of a transistor 7, operating as a driver stage. The coupling capacitor 5 is only required if A.C. coupling is desired. If D.C. coupling is possible, the capacitor 5 may be omitted. The resistor 6 serves for converting the signal 2, usually applied in the form of a control-voltage, into a current, since the conventional transistors such as the transistor 7 have to be excited by a current. If the transistor 7 is a field effect transistor, the resistor 6 might also be dispensed with.

The collector circuit of the n-p-n transistor 7 includes three resistors 8, 9 and 10; in parallel with the resistor 10 is connected an NTC resistor 11, a resistor having a negative temperature coefficient, serving for compensating temperature fluctuations of the output transistors 12 and 13. These two output transistors are controlled by the signal produced across the resistors 8 to 11. From the interconnected emitters of the transistors 12 and 13 a capacitor 15 is fed back to the junction of the resistors 8 and 9. This feedback capacitor serves for improving the linearisation of the sawtooth current finally passing through the deflection coil 16. The collector circuit of the transistor 13 includes furthermore a diode 17, which is shunted by a capacitor 18. The diode 17 serves to permit free oscillation of the deflection coil 16 during the vertical fly-back time. Finally the collector circuit of the transistor 12 includes a limiting resistor 19.

From FIG. 1 it will be apparent that transistors 12 and 13 are of opposite conductivity types; the transistor 12 is of the p-n-p type and the transistor 13 is of the n-p-n type. It is known that transistors of opposite conductivity types readily permit of constructing a series push-pull circuit with only one output (single-ended push-pull circuit), in which control can be carried out with the aid of one driver stage without the need for a separate phase inverting stage. The deflection coil 16 in such a series push-pull circuit has to be connected to one output, i.e. to the junction of the transistors 12 and 13. In the embodiment shown in FIG. 1, this one output is formed by the interconnected emitters of the transistors 12 and 13. It is, of course, also possible to connect the transistors so that their interconnected collector electrodes form the said one output.

Such a push-pull final stage has, apart from its advantages, a few disadvantages. A first disadvantage resides in the fact that the control is critical, since in fact a class B connection is concerned here, which means that one transistor produces one half and the other transistor produces the other half of the sawtooth signal. Therefore, the ideal condition would prevail if one transistor is cut off when the other is conducting and conversely. However, such a control mode is far too critical, since due to tolerances of transistor characteristics and to ageing phenomena it cannot be ensured under all conditions that the controls of the two transistors join each other accurately. It is therefore necessary to choose the excitation so that one transistor is rendered conducting an instant before the other transistor is cut off. The transitional situation is thus less critical. If the two transistors 12 and 13 were quite equivalent, no difficulties would arise when both conveyed current simultaneously, but tolerances of the transistors tend to disturb the equivalence; the simultaneous conveyance of current of the two transistors during the transitional period involves the possibility that the current of one transistor may be higher than that of the other, so that a transition jump may occur in the sawtooth signal. In order to avoid this transition jump the circuit arrangement shown in FIG. 1 is provided with a negative feedback by connecting the end of the deflection coil 16 remote from the transistors 12 and 13 to earth through a capacitor 20 and a resistor 21 and by also connecting the end of the deflection coil to the base of transistor 7 by way of resistor 28. From the junction of the capacitor 20 and the resistor 21 the resistors 22 and 23 lead back to the base of the driver transistor 7. Thus the voltage produced across the resistor 21 is fed as a negative feedback signal to the input of the driver transistor 7, the resistors 22 and 23 converting the voltage across the resistor 21 into the desired current for controlling the transistor 7. From FIG. 1 it will be apparent that the feedback network 20, 21 forms a high bandpass filter, since with increasing frequencies the capacitor 20 progressively forms a short-circuit. Consequently, by the negative feedback the higher frequencies are attenuated more than the lower frequencies. Such a frequency dependent negative feedback is required for obtaining the desired linearisation of the field deflection current, so that the television image scanned by such a field sawtooth signal exhibits satisfactory linearity.

A second reason for distortion of the sawtooth signal consists in the non-linearity of the characteristic curves of the transistors 12 and 13, so that even with an ideal control at the base electrodes of said transistors a distorted sawtooth signal would be obtained. The linearisation of this distorted signal may be achieved by the negative feedback filter 20, 21.

FIG. 1 shows diagrammatically the field deflection coil in the form of an inductance portion 24 and a resistance portion 25. It is known that any coil has, apart from inductance, copper losses, which are represented by the resistor 25 in the case of the deflection coil 16. Owing to the comparatively low frequency of about 50 to 60 c./s. of the field deflection signal the resistor 25 has a much greater effect on the passing current than the inductance 24.

Figure 4:
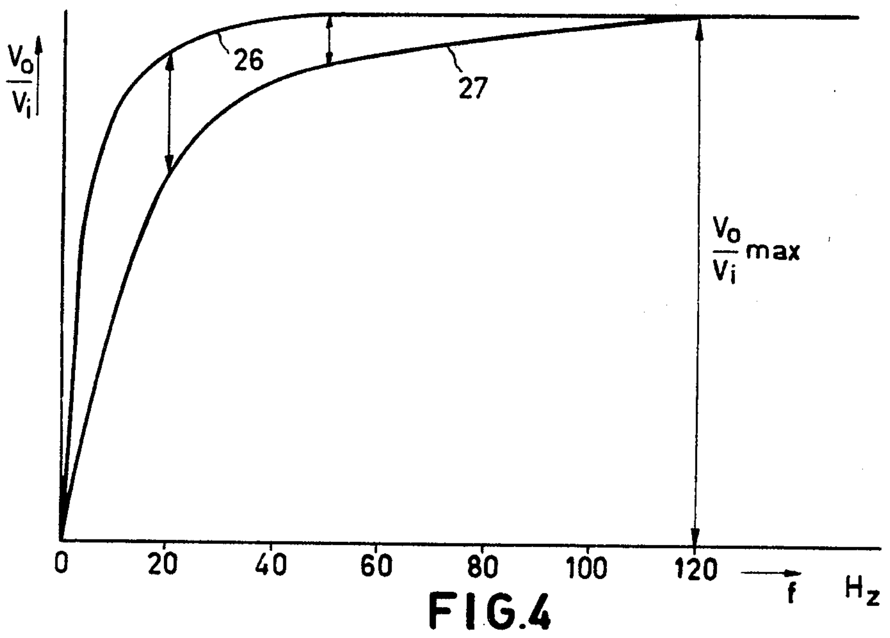
FIG. 4 shows a frequency characteristic curve of the final stage as shown in FIG. 1.

For a correct proportioning of the negative feedback the ratio between the resistor 25 and the resistor 21 is therefore important, since the sum of the resistors 21 and 25 will mainly determine the current through the deflection coil 16 and the voltage drop across the resistor 21, in turn, determines the negative feedback voltage produced. Also the choice of the capacitor 20 with respect to the resistor 21 is important, since this determines which frequencies will pass the high bandpass filter 20, 21, which fixes the frequency characteristic curve of the final stage. This will be explained more fully with reference to FIG. 4. FIG. 4 illustrates the frequency characteristic curve of the final stage of FIG. 1. It is plotted for the ratio between $V_o$ and $V_i$ as a function of the frequency $f$ in c./s. The voltage $V_i$ is the peak-to-peak value of the input signal 2 and the output voltage $V_o$ is measured across the coil 16. The line 26 in FIG. 4 is the frequency characteristic curve of the arrangement shown in FIG. 1, in which the negative feedback is brought about solely through the network 20, 21, the values of the capacitor 20 and of the resistor 21 being chosen so that the deflection coil 16 is traversed by a linear sawtooth current. From this characteristic curve it will be apparent that even very low frequencies such as 50 c./s. and 40 c./s. are practically not attenuated.

All these measures give rise to the following disadvantage. The said negative feedback through the elements 20 and 21 feeds against the supplied control-signal 2 a signal which is required for the linearisation. If the amplitude of the signal 2 is represented by the magnitude A, the final output signal, subsequent to amplification in the stages 7, 12 and 13, will have a value AB, if the amplification amounts to the value B. The negative feedback $\beta$ through 16, 20 and 21 feeds back a signal $\beta$BA to the base of transistor 7, so that, for example if $\beta BA=8/10A$, the resultant signal $A-\beta BA$ at the base of the transistor 7 will have a value of $A-\frac{8}{10}A=\frac{2}{10}A$.

When a state of synchronisation of the overall field deflection stage occurs a strong jump may appear in the amplitude of the control-signal. If, for example, the natural frequency of the field voltage oscillator is 45 c./s. and the repetition frequency of the field synchronising signals is 50 c./s., the frequency difference is 5 c./s., which is 10% of the nominal frequency of 50 c./s. If by direct synchronisation the oscillator frequency is abruptly raised from 45 c./s. to 50 c./s., an amplitude variation of about 10% will occur. With a value A of the signal 2, said variation of 10% will reduce A to $\frac{9}{10}$A. The negative feedback voltage requires, due to inertia in the overall circuit, a given period of time before the signal of the value $\frac{8}{10}$A at the input exhibits the same 10% variation. In the first place the input signal of the transistor 7 therefore comprises the varied input signal of $\frac{9}{10}$A and the not yet varied negative feedback signal of $\frac{8}{10}$A, so that it has a value of $\frac{9}{10}A-\frac{8}{10}A=\frac{1}{10}A$. This means that the input signal has decreased from $\frac{2}{10}$A to $\frac{1}{10}$A, or by 50%. This amplitude decrease may also be considered as a direct-voltage jump. The input signal of the transistor 7 exhibits so to say a direct-voltage variation of 50%. Particularly with transistors having a small control range (but also with valves, though less pronounced) this direct-voltage variation results in a cut-off of the transistor. The output signal is thus completely suppressed for a short instant and there is required a certain period of time before the normal condition is re-established by additional charging of capacitors and by restoring of currents through coils. This becomes manifest on the screen of the display tube by abrupt suppression of the vertical scan and a gradual restoration thereof. In technical language this is sometimes termed the "pudding" phenomenon. This phenomenon is particularly troublesome in modern television receivers in which the synchronisation of the generator 1, the so-called catching, is performed automatically since apart from the direct synchronisation with the aid of the vertical synchronizing pulses 4, a comparison between the synchronizing pulses 4 and the output signal of the field-voltage generator by means of a phase discriminator is performed, the resulting control-signal substantially equalizing the frequency of the signal of the field-voltage generator to that of the synchronizing pulses 4. If no measures were taken in such arrangements to avoid the aforesaid "pudding" phenomenon, the spectator would see an abrupt disappearance and re-appearance of the picture, when for some reason or other the synchronisation gets lost and is automatically restored by the synchronizing circuit. Even with abrupt variations of the supply voltage this "pudding" phenomenon may appear. An object of the present invention is to avoid this "pudding" effect.

From the foregoing it will be obvious that the said "pudding" effect can be avoided by direct transfer of the abrupt variation of the input signal of the transistor 7 to the negative feedback signal. That is, according to the present invention the feedback circuit must be constructed in such a manner, that the negative feedback directly follows the variation of the input signal, which means that the D.C. component must also be present in the feedback signal. In other words, the feedback network must include a D.C. path which directly transfers the variation from the output back to the input. Thus, with a variation in the input signal from A to $\frac{9}{10}$A, as stated above, the negative feedback signal will vary from $\frac{8}{10}$A to about $\frac{72}{100}$A (also a variation of 10%). The new input signal then has a value of $(\frac{9}{10}-\frac{72}{100})A=\frac{18}{100}A$. The input signal has thus dropped from $\frac{2}{10}$A to $\frac{18}{100}$A, i.e. a variation of $\frac{2}{100}$A, or about 10% instead of 50%. This 10% variation is sufficiently small to ensure that the transistor 7 is not cut off, so that the "pudding" effect is avoided.

A simple measure for ensuring a direct transfer of the abrupt variation in the input signal to the negative feedback signal consist in providing an additional D.C. negative feedback. This is obtained in the arrangement shown in FIG. 1 by means of the resistors 28, 29 and 30. The free end of the variable resistor 30 is connected to a negative voltage supply. Apart from the desired effect, the resistor 28 has an undesirable effect. The resistor 28 together with the existing network 20, 21 may be considered as a low bandpass filter. The capacitor 20, which is comparatively large, operates as a smoothing capacitor, which forms a short-circuit for the high frequencies to earth, while the comparatively small resistor 21 does not have a great influence. The high frequencies will therefore practically not produce any voltage at the junction of the resistor 28 and the capacitor 20, but the low-frequency components will certainly do so. Consequently, the low-frequency components are negatively fed back to a high extent, so that the initial frequency characteristic curve 26 changes into the frequency characteristic curve 27. In fact, the frequency characteristic curve 27 is the most desirable curve, since it does not exhibit the "pudding" effect. For a linear sawtooth current through the deflection coil 16, however, the curve 26 is the most desirable frequency characteristic. According to a further feature of the invention this dilemma may be obviated by choosing a control-signal 2 such that it comprises apart from the sawtooth component, a parabolic component, since such a signal has an excess quantity of low frequencies as compared with a signal comprising only a sawtooth component. This may be accounted for as follows. It is known that a parabolic signal can be obtained by the integration of a sawtooth signal. An integrating network, for example the series combination of a resistor and a capacitor, in which the input signal is fed to the series combination and the output signal is derived from the capacitor, may be considered to form a low bandpass filter. Hence, if a sawtooth signal is fed to such an integrating network, the low-frequency components of this signal are pre-emphasized with respect to the components of higher frequency in the output signal. Consequently, in a parabolic output signal the ratio between the low-frequency components and the high-frequency components is more favourable than in a sawtooth input signal. The value of the parabolic voltage added to the sawtooth signal therefore determines the excess quantity of low frequencies in the output signal. This excess quantity of low frequencies has to restore the inferior characteristic curve 27.

A reduction of the "pudding" effect may be partly achieved also by reducing the coupling capacitor 5. Due to the abrupt variation a charge variation will appear on the capacitor 5, but if this capacitor is small, the required equilibrium of the charge will be soon restored. The reduction of the capacitor 5 will also affect the frequency characteristic curve, since together with the resistors 21, 22 and 23 this coupling capacitor may be considered to be a high bandpass filter, so that the low frequencies cannot pass through. If, as is often the case in transistor circuits, the connection between the generator 1 and the driver transistor 7 is a D.C. connection, the capacitor 5 is omitted, so that reduction of this capacitor is out of the question.

A further possibility to obtain the frequency characteristic curve 27 might be the provision of the parallel combination of a resistor and a large capacitor in the emitter circuit of the driver transistor 7. Such a negative feedback circuit is possible in theory, since negative feedback then applies to the low frequencies but not to the high frequencies. In practice, however, this gives rise to difficulties. The impedance lying in the emitter circuit in parallel with the capacitor is not the parallel-connected resistor, but an impedance of the value $1/s$, in which $s$ is the mutual conductance of the transistor. The impedance $1/s$ is very small due to the high value of $s$ of such transistors, so that in general only the impedance $1/s$ has to be taken into account. For the high frequencies the impedance $1/\omega C$ must therefore be small with respect to the value $1/s$, since otherwise negative feedback will occur also for these high frequencies. In practice it appears to be very difficult to fulfil the aforesaid conditions, so that negative feedback with the aid of the parallel combination of a resistor and a capacitor in the emitter circuit of the transistor 7 does not yield satisfactory results. Therefore, the negative feedback by means of the network 20, 21 is preferred for the A.C. part and that by means of the resistor 28 is preferred for the D.C. part.

The circuit arrangement shown in FIG. 1 furthermore comprises the resistors 29 and 30. By means thereof the D.C. adjustment of the transistor 7 is determined. By varying the resistor 30 the transistor can be adjusted at will. By providing the resistors 29 and 30 the resistor 28 may be smaller, while the same pre-adjustment of the transistor 7 is maintained. A smaller resistor 28 involves an improved negative feedback operation.

Figure 2:
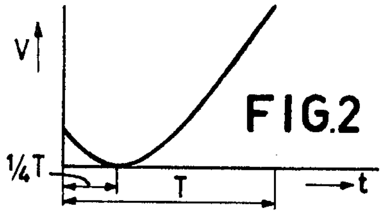
FIG. 2 shows a first possible input voltage waveform for the circuit of FIG. 1.
Figure 3:
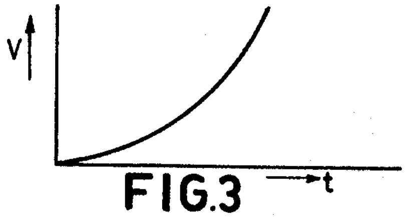
FIG. 3 shows a second input voltage waveform for the circuit of FIG. 1.

From the foregoing it will appear that the low frequencies in the output stage may be attenuated, if desired, to a greater extent, if it is at the same time ensured that an excess quantity of low frequencies is contained in the control-signal 2 by adding an adequate parabolic voltage. From the curves of FIGS. 2 and 3 it appears that as more parabolic voltage is added, that is to say, when the quantity of low frequencies is increased, the minimum is shifted further to the center of the stroke. In the embodiment shown in FIG. 2 this minimum is located at $1/4T$, T being the vertical stroke period. In FIG. 3 the minimum is located substantially at the beginning of the stroke.

In a preferred embodiment in which the deflection coil 16 surrounds the neck of a television display tube having a screen diameter of 27 cms. and an angle of deflection of 90°, the desired frequency characteristic curve was the curve 27 of FIG. 4. The maximum level $V_o/V_{imax}$ applies substantially to the whole high-frequency range. From about 120 c./s. the characteristic curve drops practically continuously so that as compared with the maximum level an attenuation of about 1 db is found at 50 c./s. and an attenuation of about 3.5 db at 20 c./s. With such a frequency characteristic curve the minimum of the control-signal 2 has to lie practically at the beginning of a vertical stroke in order to replenish the deficit of low frequencies. The various resistors and capacitors essential for the embodiment shown are given in the following table.

Resistor 6=5.6K ohms
Resistor 21=1 ohm
Resistor 22=500 ohms
Resistor 23=potentiometer 1K ohm
Resistor portion of the deflection coil 16, resistor 25=7 ohms
Resistor 28=15K ohms
Resistor 29=100K ohms
Resistor 30=potentiometer 100K ohms Capacitor 5=80 $\mu$f.
Capacitor 20=1000 $\mu$f.

Although in the foregoing the circuit arrangement is described with reference to FIG. 1, in which a driver transistor 7 and a series push-pull circuit are used, the principle of the invention may, of course, also be carried out in arrangement of different type. It is, for example, not always necessary to use a driver transistor 7, if the generator 1 is capable of supplying a control-signal of adequate value. With the series push-pull connection comprising two transistors of opposite conductivity type it is desirable to use a driver transistor, since a single transistor is then capable of supplying the control-signals for the two transistors. In principle it is also possible to provide a push-pull stage comprising two transistors of the same conductivity type. By means of a phase inverting stage, for example a transformer, the signal from the generator 1 is then converted into two control-signals for the two output transistors. It is neither necessary to employ a push-pull stage; it is also possible to produce directly the sawtooth current through the deflection coil 16 by one transistor. In the arrangement shown in FIG. 1 this may be achieved by replacing the transistor 13 by a choke. This is referred to as a choke coupling. However, transistors are particularly important for the arrangements described above, since the internal impedance thereof is very suitable for direct adaptation to the field deflection coil without the need for coupling through a transformer for adapting the impedances.

What is claimed is:

1. A circuit for producing a sawtooth current through the field deflection coil of a cathode ray tube, comprising a source of a control signal having a waveform that is the sum of a substantially sawtooth waveform and a substantially parabolic signal, an output stage having an output circuit directly connected to said deflection coil, means applying said control signal to said output stage, and attenuating means comprising a direct current negative feedback path connected between said deflection coil and the input of said output stage for attenuating the low frequency components of signals in said output circuit with respect to the higher frequency components.

2. The circuit of claim 1 wherein said output stage comprises a single-ended push-pull circuit connected directly to said deflection coil, and a driver stage connected to apply control signals to said push-pull circuit, and said attenuating means further comprises a second negative feedback path connected between said deflection coil and the input of said driver stage by way of a high band pass filter for linearizing the sawtooth waveform current through said deflection coil.

3. The circuit of claim 1 wherein said output stage comprises a push-pull stage having first and second transistors, means serially connecting the emitter-collector paths of said first and second transistors, means applying said control signal to the bases of said first and second transistors, means connecting one end of said deflection coil to the junction of the emitter-collector paths of said first and second transistors, and said attenuating means is connected between the other end of said deflection coil and said input of said output stage.

4. The circuit of claim 3 wherein said direct current feedback path is a direct current conductive path comprising resistor means connected between said other end of said deflection coil and said input of said output stage.

5. The circuit of claim 3 comprising a second feedback path of capacitor means and resistor means connected in that order between said other end of said deflection coil and a point of reference potential, and means connecting the junction of said capacitor means and resistor means to the input of said output stage.

6. The circuit of claim 3 wherein said means applying said control signal to the bases of said first and second transistors comprises a third transistor, means directly connecting the base of said third transistor to the input of said output stage, means directly connecting the collector of said third transistor to the bases of said first and second transistors, and means connecting the emitter of said third transistor to a point of constant potential.

References Cited

UNITED STATES PATENTS

| | | | |
|---|---|---|---|
| 2,913,625 | 11/1959 | Finkelstein | 315—27 |
| 3,191,091 | 6/1965 | Pollak | 315—27 |

RODNEY D. BENNETT, *Primary Examiner.*

JOSEPH G. BAXTER, *Assistant Examiner.*